(12) United States Patent
Culver

(10) Patent No.: US 7,379,273 B2
(45) Date of Patent: May 27, 2008

(54) ANTI-GALL BEARING WITH CAPTIVE SCREW

(75) Inventor: Darrel Ray Culver, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 417 days.

(21) Appl. No.: 10/842,198

(22) Filed: May 10, 2004

(65) Prior Publication Data

US 2005/0248886 A1    Nov. 10, 2005

(51) Int. Cl.
*G11B 5/55* (2006.01)
*G11B 21/08* (2006.01)

(52) U.S. Cl. .................................. 360/265.6
(58) Field of Classification Search ............. 360/265.6, 360/265.2, 265.4, 265.3, 265.5, 264.3, 264.1; 369/255, 269
See application file for complete search history.

(56) References Cited

U.S. PATENT DOCUMENTS

| | | | |
|---|---|---|---|
| 5,311,763 A * | 5/1994 | Gibbs et al. ...................... 73/9 |
| 5,315,465 A | 5/1994 | Blanks | |
| 5,539,597 A * | 7/1996 | Blanks ..................... 360/265.6 |
| 5,675,456 A | 10/1997 | Myers | |
| 5,751,519 A | 5/1998 | Hata | |
| 5,754,372 A | 5/1998 | Ramsdell et al. | |
| 5,864,441 A * | 1/1999 | Coffey et al. ............ 360/97.01 |
| 5,914,837 A * | 6/1999 | Edwards et al. ......... 360/265.6 |
| 6,256,173 B1 | 7/2001 | Chee et al. | |
| 6,342,992 B1 | 1/2002 | Prater et al. | |
| 6,525,910 B1 | 2/2003 | Macpherson et al. | |
| 6,574,186 B2 * | 6/2003 | Nii et al. ..................... 369/269 |
| 6,603,640 B1 * | 8/2003 | Prater et al. ............. 360/265.6 |
| 6,705,760 B2 * | 3/2004 | Takayanagi .................. 384/100 |
| 2002/0114109 A1 | 8/2002 | Yuki et al. | |
| 2002/0167762 A1 | 11/2002 | Kan et al. | |
| 2003/0048574 A1 * | 3/2003 | Khan et al. .............. 360/99.08 |
| 2003/0156358 A1 * | 8/2003 | Jeong ....................... 360/265.6 |
| 2005/0213256 A1 * | 9/2005 | Dexter et al. ............ 306/265.6 |

* cited by examiner

*Primary Examiner*—Brian E. Miller
*Assistant Examiner*—Matthew G. Kayrish
(74) *Attorney, Agent, or Firm*—David K. Lucente

(57) ABSTRACT

A bearing assembly to mount an actuator on a mounting hub of a data storage device comprises a cylindrical hub for the actuator having an internal bore along a cylindrical hub axis. The bearing assembly also has one or more bearings mounted inside the internal bore of the cylindrical hub and a sleeve mounted inside the one or more bearings so that the cylindrical hub rotates relative to the sleeve. The sleeve is adapted to contact a mounting hub. A single piece captive screw is retained within the sleeve and is free to rotate about the cylindrical hub axis independent of the sleeve to engage the mounting hub and tighten the sleeve to the mounting hub.

13 Claims, 4 Drawing Sheets

ANTI-GALL BEARING WITH CAPTIVE SCREW

FIELD OF THE INVENTION

This application relates generally to data storage devices and more particularly to a bearing assembly for an actuator of a data storage device.

BACKGROUND OF THE INVENTION

Various types of data storage devices store digital data in magnetic or optical form on a rotating storage medium. Modern magnetic disc drives, for example, comprise one or more rigid discs that are coated with a magnetizable medium and mounted on the hub of a spindle motor for rotation at a constant high speed. Information is stored on the discs in a plurality of concentric circular tracks typically by an array of transducers ("heads") mounted to a rotary actuator for movement of the heads substantially radially relative to the discs. Each of the concentric tracks is generally divided into a plurality of separately addressable data sectors. The read/write transducer, e.g. a magneto-resistive read/inductive write head, is used to transfer data between a desired track and an external environment.

The heads are mounted via flexures at the ends of a plurality of arms which project radially outward from a substantially cylindrical actuator body. The actuator body, via a bearing assembly, pivots about a shaft mounted to a base deck of the data storage device. The bearing assembly, having a cylindrical hub containing bearings and the shaft, is fitted to and secured within the actuator body. The shaft has a threaded portion extending below the bearing assembly and actuator body and a head, accessible at the top of the bearing assembly, that is adapted to accept a tool such as a screwdriver or wrench. During assembly, the actuator assembly, via the shaft of the bearing assembly is secured to the base deck of the data storage device. That is, the threaded portion of the shaft is screwed into a corresponding hole in the base deck.

Since the heads on the actuator arms are typically maintained in very close proximity to the surface of the storage medium, alignment of the actuator arms should be parallel to the surface of the storage medium. Therefore, it is very important that the shaft of the bearing assembly is properly aligned with the base deck and with the axis of rotation of the spindle motor and the storage medium so that the heads move in a plane parallel with the surfaces of the storage medium. Misalignment of the shaft when securing it to the base deck may cause misalignment of the actuator arms which may in turn cause the heads to contact the surface of the storage medium.

The base deck is machined to ensure proper alignment of the shaft of the bearing assembly. However, the base deck is typically manufactured of a lightweight and relatively soft material such as aluminum. In contrast, the shaft and bearing assembly is typically manufactured of a relatively hard material such as stainless steel. Further, when the shaft is screwed into the base deck significant torsional force can be applied to the mating surfaces of the base deck and shaft. In some cases, these torsional forces cause galling of the softer base deck surface. This galling then causes misalignment of the shaft and actuator assembly.

FIG. 1 is a cross-sectional side view of a prior art bearing assembly for an actuator of a data storage device. The bearing assembly 200 consists of a cylindrical hub 204 in which a shaft 207 is mounted. The cylindrical hub 204 is connected with, and may rotate about, the shaft 207 via bearing 205 and 206 mounted on the inside surface of the cylindrical hub 204 and encompassing the shaft 207.

The cylindrical hub 204 is shaped and sized to mate with a corresponding hole in the actuator body (not shown in this view). The bearing assembly 200 will be pressed into the hole in the actuator body and secured to the actuator via a flange 213 extending from the top of the cylindrical hub 204 and a nut (not shown) engaging threads 214 at the bottom of the cylindrical hub 204.

The bearings 205 and 206 are mounted on the interior of the cylindrical hub 204. Spacer 217 is machined into the interior surface of cylindrical hub 204 and provides for proper positioning of the bearing 205 and 206. Typically, bearings 205 and 206 are adhesively affixed to the interior of the cylindrical hub 204. However, spacer 217 also helps secure the bearings 205 and 206 within the cylindrical hub 204.

The body 208 of shaft 207 passes through the center of the bearings 205 and 206 and is typically adhesively affixed to the bearings 205 and 206. A flange 210 extending from the body 208 of shaft 207 helps to secure the shaft 207 within the bearings 205 and 206 and provides a mounting surface 215 for the bearing assembly 200. Shaft 207 also has a screw 211 extending from the bottom of the shaft 208. Threads 212 on the screw 211 provide a means to attach the bearing assembly to the base deck 102 of the data storage device.

The base deck 102 of the data storage device has a mounting hub 202 extending upwards from its top surface. The mounting hub 202 contains a tapped hole 203 to accept the threads 212 on the shaft 207 of the bearing assembly 200. Additionally, the mounting hub 202 has a machined surface 216 onto which the bearing assembly 200 will be mounted. When assembled, the bearing assembly 200 will be mounted on mounting hub 202 via screw 211 and tightened via a tool such as a screwdriver or wrench applied to an appropriately shaped head 209 on the body 208 of the shaft 207. The shaft 207 is then screwed into the mounting hub 202 until the lower surface 215 of flange 210 makes tight contact with the machined surface 216 of the mounting hub 202.

However, such a design can cause galling of the machined surface of the mounting hub. Since the flange 210 on the lower part of the body 208 of the shaft 207 turns with the body 208 as the screw 211 is tightened into the mounting hub 202, significant torsional force is applied to the machined surface 216 of the mounting hub 202. Additionally, the material of the base deck 102 of the data storage device 100 is likely to be aluminum or a similar lightweight material that is significantly softer than the stainless steel or similar material used for the shaft 207 of the bearing assembly 200. Therefore, galling of the machined surface 216 of the mounting hub 202 may occur. Furthermore, disassembly and reassembly of the drive, such as when the drive is reworked or remanufactured, will only exacerbate the problem by increasing the amount of galling when the bearing assembly is removed and reinstalled.

Accordingly there is a need for a bearing assembly that can be secured to a base deck of a data storage device without galling the surface to which the bearing assembly is secured. The present invention provides a solution to this and other problems, and offers other advantages over the prior art.

SUMMARY OF THE INVENTION

Against this backdrop the present invention has been developed. According to the present invention a bearing assembly to mount an actuator on a mounting hub of a data storage device has a cylindrical hub for the actuator having an internal bore along a cylindrical hub axis. The bearing assembly also has one or more bearings inside the internal bore of the cylindrical hub and a sleeve mounted inside the one or more bearings so that the cylindrical hub rotates relative to the sleeve. The sleeve is adapted to contact the mounting hub. A single piece captive screw is retained within the sleeve and is free to rotate about the axis of the cylindrical hub independent of the sleeve to engage the mounting hub and tighten the sleeve to the mounting hub.

These and various other features as well as advantages which characterize the present invention will be apparent from a reading of the following detailed description and a review of the associated drawings.

DETAILED DESCRIPTION

Embodiments of the present invention will be discussed with reference to a magnetic disc drive. One skilled in the art will recognize that the present invention may also be applied to any data storage device, such as an optical disc drive, a magneto-optical disc drive, or other type of device that utilizes an actuator assembly.

Figure 1:
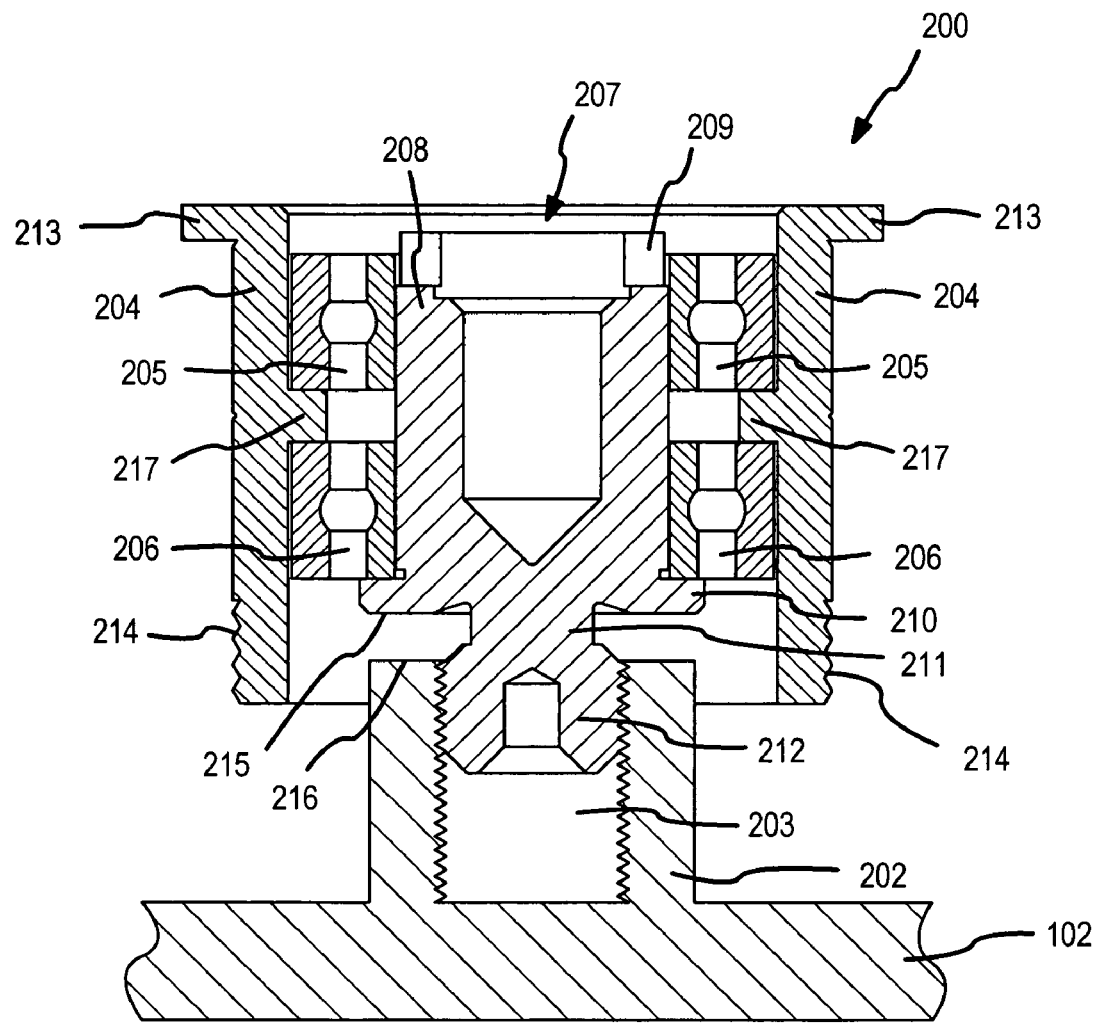
FIG. 1 is a cross-sectional side view of a prior art bearing assembly for an actuator of a data storage device.
Figure 2:
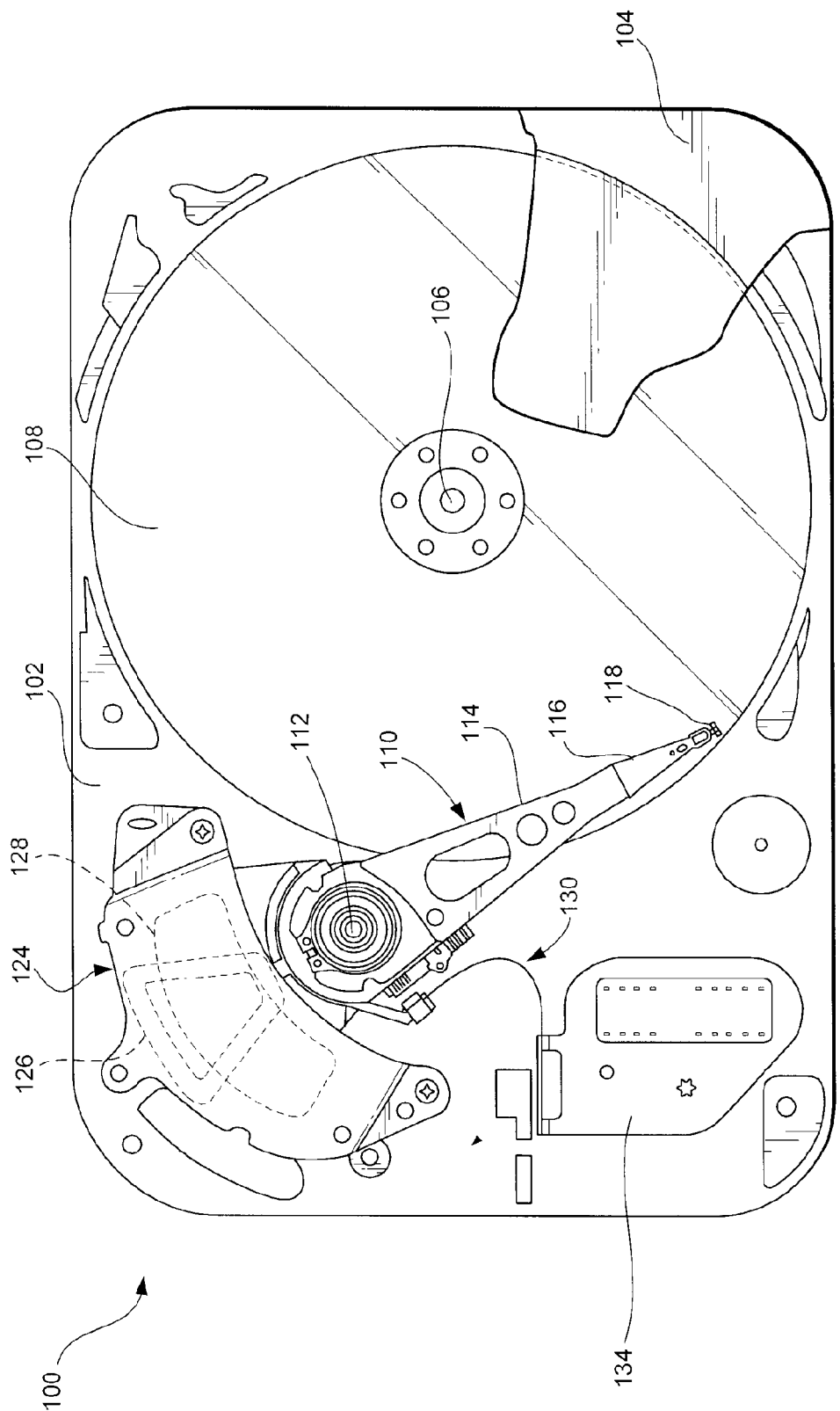
FIG. 2 is a plan view illustrating the primary internal components of a disc drive incorporating one of the various embodiments of the present invention.

FIG. 2 is a plan view illustrating the primary internal components of a disc drive incorporating one of the various embodiments of the present invention. The disc drive 100 includes a base deck 102 to which various components of the disc drive 100 are mounted. A top cover 104, shown partially cut away, cooperates with the base deck 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a shaft within a bearing assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the shaft of the bearing assembly 112, and the heads 118 are caused to move across the surfaces of the discs 108.

The spindle motor 106 is typically de-energized when the disc drive 100 is not in use for extended periods of time. The heads 118 are moved over park zones near the inner diameter of the discs 108 when the drive motor is de-energized. The heads 118 are secured over the park zones through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board to which head wires (not shown) are connected; the head wires being routed along the actuator arms 114 and the flexures 116 to the heads 118. The printed circuit board typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 3:
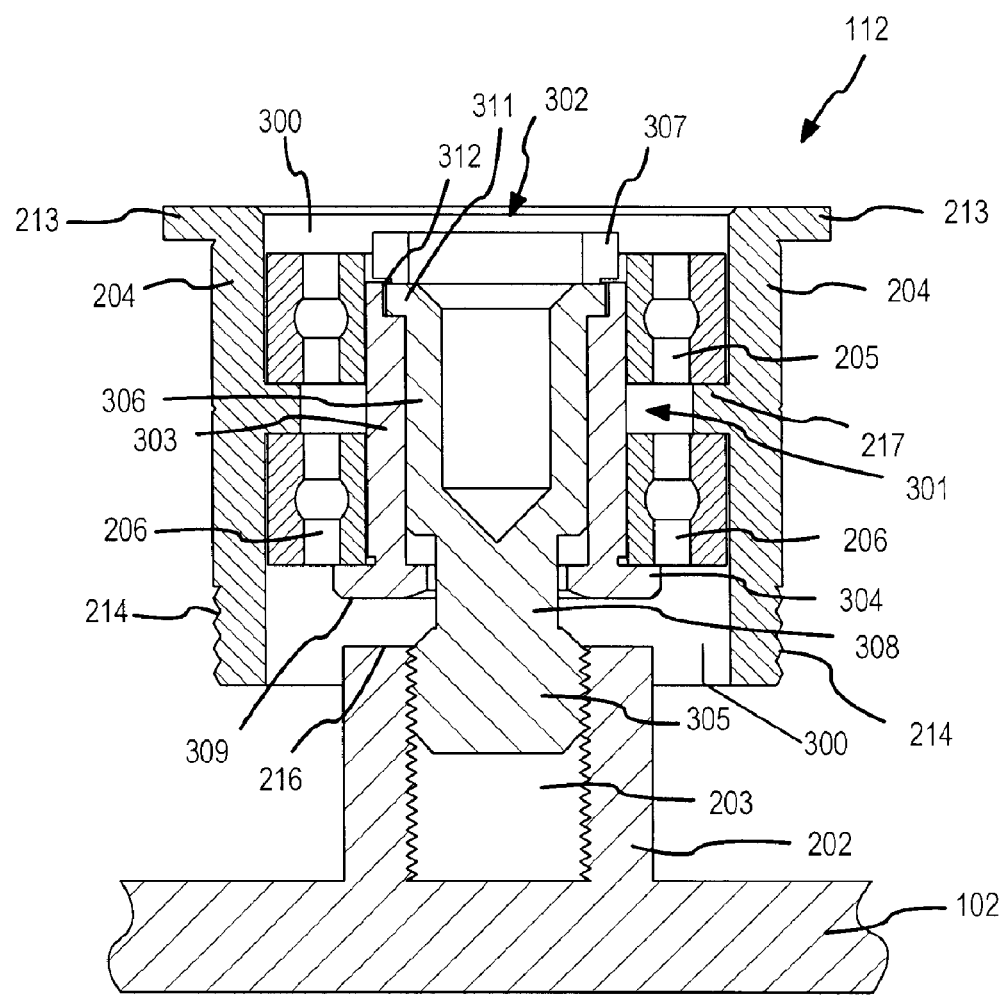
FIG. 3 is a cross-sectional side view of a bearing assembly according to one embodiment of the present invention where the bearing assembly includes a captive screw retained in a sleeve to engage a mounting hub.

FIG. 3 is a cross-sectional side view of a bearing assembly according to one embodiment of the present invention. In this example, the bearing assembly 112 has a cylindrical hub 204 for the actuator. The cylindrical hub 204 has an internal bore 300 along a cylindrical hub axis with the bore open at the top and bottom ends. Circular bearings 205 and 206 are mounted along the inside surface of the internal bore 300 of the cylindrical hub 204. This example illustrates two ball bearings 205 and 206. However, a different number and different types of bearings may be used. For example, one roller type bearing may be used instead of two ball bearings.

Bearings 205 and 206 may be adhesively affixed to the inside surface of the cylindrical hub 204 to retain the bearings 205 and 206 within the bearing assembly 112. Alternatively, bearings 205 and 206 may be retained inside the cylindrical hub 204 by other means. For example, bearings 205 and 206 may be press fit or spot welded into place within the cylindrical hub 204.

This example also illustrates a spacer 217 machined into the interior surface of cylindrical hub 204. However, a different configuration or no spacer at all may be used in some bearing assemblies. If utilized, spacer 217 helps to provide for proper positioning of the bearing 205 and 206 and also helps to secure the bearings 205 and 206 within the cylindrical hub 204.

Also illustrated in this embodiment is a flange 213 extending from the top of the cylindrical hub 204 and threads around the outside of the cylindrical hub 204 at the bottom. The bearing assembly 112 may be secured to the actuator via the flange 213 and a nut (not shown) engaging the threads 214 at the bottom of the cylindrical hub 204. Other arrangements for the flange 214 and threads 214 or other means of securing the bearing assembly 112 within the actuator may be used. However, an arrangement such as the one illustrated allows the bearing assembly to be easily utilized in place of existing designs.

A sleeve 301 is positioned inside the bearings 205 and 206 so that the cylindrical hub 204 rotates relative to the sleeve 301. The sleeve 301 has a cylindrical body 303 that is adapted to accept a captive screw 302 and to contact the top surface 216 of the mounting hub 202. The sleeve 301 may be adhesively affixed to the inside surface of the bearings 205 and 206 to retain the sleeve 301 and the captive screw 302 within the bearing assembly 112. Alternatively, the sleeve 301 may be retained inside the cylindrical hub 204 by other means. For example, the sleeve 301 may be press fit or spot-welded into place within the bearings 205 and 206.

A flange 304 extends from the bottom of the body portion 303 of the sleeve 301. The flange 304 extends outward from the body portion 303 to engage the bearing 206 and inward from the body to retain the captive screw 302. Also, as will be discussed below, the bottom surface 309 of the flange 304 contacts the machined surface 216 of the mounting hub 202 when the bearing assembly 112 is installed on the mounting hub 202 extending from the base deck 102 of the data storage device 100.

A captive screw 302 is retained within the sleeve 301 and is free to rotate about the cylindrical hub axis independent of the sleeve 301. The captive screw 302 has a thread portion 305 adapted to engage threads in the mounting hub 202 of a base deck 102 to tighten the sleeve 301 to the mounting hub 202.

The captive screw 302 also has a shaft portion 306 extending from the thread portion 305. The shaft portion 306 has a reduced diameter portion 308 above the thread portion 305. The reduced diameter portion 308 is adapted to accept the flange portion 304 of the sleeve 301 and thereby help retain the captive screw 302 within the sleeve 301.

During manufacture of the bearing assembly 112, the captive screw 302 is placed into the body 303 of the sleeve 301 to engage a small amount of threading (not shown) on the inner diameter of the flange portion 304 of the sleeve 301. The captive screw 302 is turned into and through these threads until it is free of the threads but retained within the sleeve 301.

Additionally, the captive screw 302 has a head portion 307 extending from the shaft portion 306 that is adapted to accept a tool such as a screwdriver or wrench used to tighten the bearing assembly to the mounting hub of the base deck. The head portion 311 also extends over the top edge of the sleeve 301 and counter bore 312 to press downward on the sleeve 301 when the captive screw 302 is screwed into the mounting hub 202 thereby securing the bearing assembly 112 to the base deck 102 of the data storage device 100. Optionally, a portion 311 of the shaft 306 and corresponding diameter of body 303 may be machined to very close tolerances to provide improved alignment of the captive screw 302 within the sleeve 301 while still allowing the captive screw 302 to rotate within the sleeve 301.

During assembly of the data storage device 100, the thread portion 305 of the captive screw 302 is positioned to engage the threads in the mounting hub 202. The captive screw 302 is then screwed into the mounting hub 202 using a tool such as a screwdriver or wrench engaging the head portion 307 of captive screw 302. As the bearing assembly 112, via captive screw 302, is screwed down to the mounting hub 202, the bottom surface 309 of the flange 304 on the sleeve 301 contacts the machined surface 216 of the mounting hub 202. Since the captive screw is free to rotate within the sleeve 301, the bottom surface 309 of the flange 304 does not move on the machine surface 216 of the mounting hub 202. Some of the torsional forces applied to the captive screw 302 will be transferred to the sleeve 301 due to friction whereby the head portion 311 of the captive screw 302 contacts the sleeve 301. However, due to the relatively small surface area where this contact is made, friction between the sleeve 301 and captive screw 302 is negligible and the torsional force transferred to the sleeve 301 is not sufficient to cause galling of the machined surface 216 of the mounting hub 202.

Figure 4:
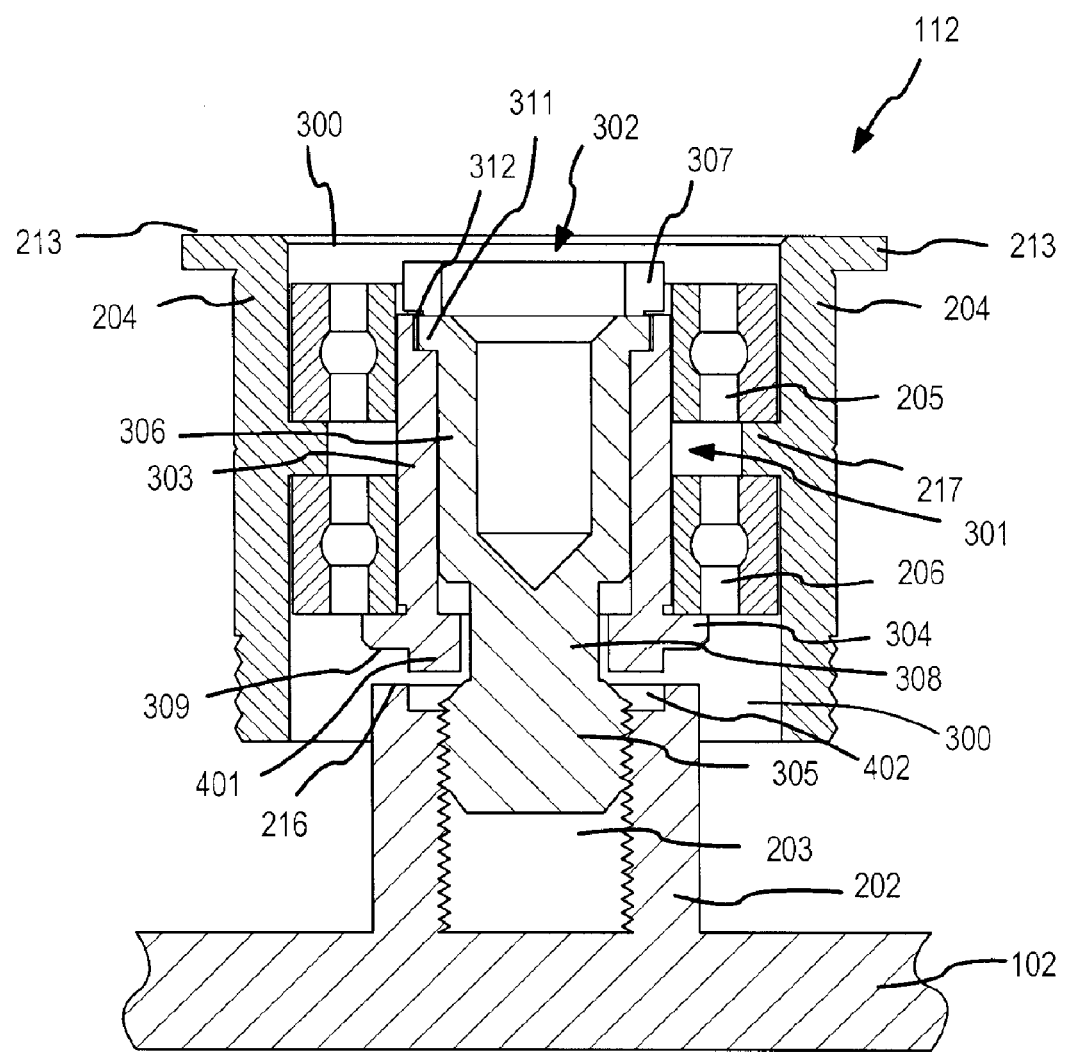
FIG. 4 is a cross-sectional side view of a bearing assembly according to an alternative embodiment of the present invention where the sleeve includes a pilot.

FIG. 4 is a cross-sectional side view of a bearing assembly according to an alternative embodiment of the present invention. Illustrated here, as in the previous example, is a bearing assembly 112 with a cylindrical hub 204 for the actuator. The cylindrical hub 204 has an internal bore 300 that is open at the top and bottom ends. Circular bearings 205 and 206 are mounted along the inside surface of the cylindrical hub 204. As explained above, a different number and different types of bearings may be used. For example, one roller type bearing may be used instead of two ball bearings. Also as explained above, bearings 205 and 206 may be adhesively affixed to the inside surface of the cylindrical hub 204 to retain the bearings 205 and 206 within the bearing assembly 112. Alternatively, bearings 205 and 206 may be retained inside the cylindrical hub 204 by other means. For example, bearings 205 and 206 may be press fit or spot welded into place within the cylindrical hub 204.

A sleeve 301 is mounted inside the bearings 205 and 206. The sleeve 301 has a cylindrical body 303 that is adapted to accept a captive screw 302. The sleeve 301 may be adhesively affixed to the inside surface of the bearings 205 and 206 to retain the sleeve 301 and the captive screw 302 within the bearing assembly 112. Alternatively, the sleeve 301 may be retained inside the cylindrical hub 204 by other means. For example, the sleeve 301 may be press fit or spot-welded into place within the bearings 205 and 206.

A flange 304 extends from the bottom of the body portion 303 of the sleeve 301. The flange 304 extends outward from the body portion 303 to engage the bearing 206 and inward from the body to retain the captive screw 302. The bottom surface 309 of the flange 304 contacts the machined surface 216 of the mounting hub 202 when the bearing assembly 112 is installed on the base deck 102 of the data storage device 100.

In this embodiment, the sleeve 301 also has a pilot 401 extending from the flange 304 along the inner edge. The pilot is adapted to engage a recessed area 402 around the inner diameter of mounting hub 202. The pilot 401 and the recessed area 402 may be machined to close tolerances and aid in the proper alignment of the bearing assembly 112 with the mounting hub 202.

As in the previous example, a captive screw 302 is retained within the sleeve 301 but is free to rotate about the cylindrical hub axis of the cylindrical hub 204 independent of the sleeve 301. The captive screw 302 has a thread portion 305 adapted to engage threads in the mounting hub 202 of a base deck 102.

The captive screw 302 also has a shaft portion 306. The shaft portion 306 has a reduced diameter portion 308 above the thread portion 305. The reduced diameter portion 308 is adapted to engage the flange portion 304 of the sleeve 301 and thereby retain the captive screw 302 within the sleeve 301.

Additionally, the captive screw 302 has a head portion 307 that is adapted to accept a tool such as a screwdriver or wrench used to tighten the bearing assembly to the mounting hub of the base deck. The head portion 307 also extends over the top edge of the sleeve 301 and counter bore 312 to press downward on the sleeve 301 when the captive screw 302 is screwed into the mounting hub 202 thereby securing the bearing assembly 112 to the base deck 102 of the data storage device 100.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the sleeve may be retained within the bearing assembly by means other than adhesive. Additionally, different arrangements for retaining the captive screw within the sleeve may also be used. Numerous other changes may be made which will readily suggest themselves to those skilled in the art and which are encompassed in the spirit of the invention disclosed and as defined in the appended claims.

What is claimed is:

1. A bearing assembly for mounting an actuator on a mounting hub, the bearing assembly comprising:
    a cylindrical hub for supporting the actuator, the cylindrical hub having an internal bore along a cylindrical hub axis;
    a sleeve mounted inside the cylindrical hub so that the cylindrical hub is configured to rotate relative to the sleeve; and
    a captive screw for mounting the bearing assembly to the mounting hub, the screw being positioned within the sleeve and free to rotate independent of the sleeve, the screw and sleeve being configured to prevent removal of the screw from the sleeve when the bearing assembly is not mounted to the hub.

2. The bearing assembly of claim 1, wherein the sleeve comprises:
    a cylindrical body adapted to accept the captive screw; and
    a flange portion extending from a bottom of the body portion.

3. The bearing assembly of claim 2, wherein the flange portion extends outward from the body portion to engage the bearing and inward from the body to retain the captive screw.

4. The bearing assembly of claim 3, wherein the sleeve further comprises a pilot extending from the flange along an inner edge of the flange, the pilot adapted to engage a recessed area around an inner diameter of the mounting hub.

5. The bearing assembly of claim 3, wherein the captive screw comprises:
    a thread portion adapted to engage a threaded opening in the mounting hub;
    a cylindrical shaft portion extending from the tread portion; and
    a head portion extending from the shaft portion and beyond a top edge of the sleeve.

6. The bearing assembly of claim 5, wherein the head portion is adapted to accept a tool.

7. The bearing assembly of claim 5, wherein the shaft portion has a reduced diameter portion above the thread portion, the reduced diameter portion adapted to accept the flange portion of the sleeve.

8. The bearing assembly of claim 5, wherein the captive screw further comprises a ridge underneath the head portion, the ridge adapted to fit into a corresponding counter bore around an inner diameter at the top of the sleeve.

9. The bearing assembly of claim 1, further comprising:
    one or more bearings affixed to an inside surface of the internal bore of the cylindrical hub.

10. The bearing assembly of claim 9, wherein the sleeve is adhesively affixed to the one or more bearings.

11. A data storage device, comprising:
    the bearing assembly of claim 1;
    the actuator assembly; and
    a base deck, in which the mounting hub is mounted to the base deck and the bearing assembly is mounted to the mounting hub.

12. The data storage device of claim 11, further comprising:
    a data storage medium supported by the base deck; and
    an element for accessing data on the data storage medium, the element being mounted to the actuator assembly.

13. The data storage device of claim 12, in which the data storage medium comprises a magnetic medium.

* * * * *